United States Patent
Bouillet (10) Patent No.: US 8,855,576 B2
(45) Date of Patent: Oct. 7, 2014

(54) APPARATUS AND METHOD FOR SETTING THE OPERATION OF AN ANTENNA

(71) Applicant: Thomson Licensing, Issy de Moulineaux (FR)

(72) Inventor: Aaron Reel Bouillet, Noblesville, IN (US)

(73) Assignee: Thomson Licensing, Issy les Moulineaux (FR)

( * ) Notice: Subject to any disclaimer, the term of this patent is extended or adjusted under 35 U.S.C. 154(b) by 172 days.

(21) Appl. No.: 13/626,093

(22) Filed: Sep. 25, 2012

(65) Prior Publication Data

US 2013/0078926 A1 Mar. 28, 2013

Related U.S. Application Data

(60) Provisional application No. 61/539,589, filed on Sep. 27, 2011, provisional application No. 61/539,626, filed on Sep. 27, 2011.

(51) Int. Cl.
*H04B 1/00* (2006.01)
*H04B 7/00* (2006.01)
*H04B 17/00* (2006.01)
*H04B 7/08* (2006.01)

(52) U.S. Cl.
CPC ........ *H04B 17/0065* (2013.01); *H04B 17/0022* (2013.01); *H04B 7/0825* (2013.01); *H04B 17/008* (2013.01)
USPC ....... 455/68; 455/422.1; 455/517; 455/550.1; 370/328

(58) Field of Classification Search
USPC ............ 455/41.2, 41.3, 68, 88, 422.1, 456.1, 455/456.5, 456.6, 500, 507, 517, 550.1, 455/552.1, 553.1, 561, 562.1; 370/328, 338
See application file for complete search history.

(56) References Cited

U.S. PATENT DOCUMENTS

| | | | |
|---|---|---|---|
| 6,992,991 B2 * | 1/2006 | Duske et al. | 370/316 |
| 7,729,677 B2 | 6/2010 | Saed et al. | |
| 2004/0236547 A1 * | 11/2004 | Rappaport et al. | 703/2 |
| 2007/0069030 A1 * | 3/2007 | Sauerwein et al. | 235/462.46 |
| 2008/0130599 A1 | 6/2008 | Horikoshi et al. | |
| 2008/0300022 A1 | 12/2008 | Dong et al. | |
| 2010/0173640 A1 | 7/2010 | Pajukoski et al. | |
| 2010/0316155 A1 | 12/2010 | Reinhold | |

FOREIGN PATENT DOCUMENTS

| | | |
|---|---|---|
| CN | 102185642 | 9/2011 |
| JP | 2011018988 | 1/2011 |

* cited by examiner

*Primary Examiner* — Nhan Le
(74) *Attorney, Agent, or Firm* — Robert D. Shedd; Vincent E. Duffy; Michael A. Pugel (57) ABSTRACT

A method and apparatus for allowing a configuration of the operation of one or more antennas in a device, such as a gateway device or other network device, is provided. The method and apparatus operate in a manner such that the configuration allows a static configuration of a specific antenna in a multiple antenna device or system. In some cases the accompanying transmission and reception circuit are configured to operate or transact specifically with another device (e.g., network client device).

15 Claims, 8 Drawing Sheets

APPARATUS AND METHOD FOR SETTING THE OPERATION OF AN ANTENNA

CROSS REFERENCE TO RELATED APPLICATION

This application claims priority to and all benefits accruing from a provisional application filed in the United States Patent and Trademark Office on Sep. 27, 2011, and assigned Ser. No. 61/539,589 and a provisional application filed in the United States Patent and Trademark Office on Sep. 27, 2011, and assigned Ser. No. 61/539,626.

BACKGROUND OF THE INVENTION

1. Field of the Invention

The present disclosure generally relates to an apparatus and method for setting the operation of an antenna system and more particularly to allowing a configuration of the operation of one or more antennas in a device and/or system, such as a gateway device or other network device.

2. Background Information

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Communications devices used in the home, such as modems and residential gateways, provide users with a means to connect computing devices to the internet or other wide area networks. These communications devices further provide interfaces, including wired and/or wireless interfaces, to a home or local area network in order to communicate with other home devices, such as computers, tablets, set top boxes, internet enabled appliances, and the like. Many currently available communications devices also provide a number of operational features to enhance the wide array of possible applications. These devices often have a user interface and controls to permit its user to modify its settings during use in the various applications. For example, devices that operate as gateways may provide users with a remote handset to modify settings and run gateway applications. Alternatively, gateway settings can be modified through a web browser accessed through the gateway or through a separate device. The gateway applications may also mimic functions that can be performed through a browser.

Many of the home communications devices interface to an external network, such as a cable or digital subscriber line (DSL) network through a modem transceiver. Modern cable modem transceivers provide internet access and voice services to customers over the cable television network. These communications devices permit the connection of consumer premises equipment (CPE), such as personal computers and voice over internet protocol (VOIP) handsets, to the external network. These communications devices also often employ one or more local area network wireless transmit/receive circuits. These circuits typically include tuners, transmitters, demodulators, and modulators used to transmit and receive the data signal over the wireless system using a particular signaling protocol. Further these systems also may employ multiple antennas. Many home devices (e.g., home computers, tablets, and the like) may also include similar circuits and further permit use of multiple antennas.

However, these communications devices often do not permit some features or controls to be individually configurable for various operating conditions. For instance, transmit/receive circuits may employ multiple antennas operating in a manner that assumes that all antennas are required to operate for all communications. Operation may be limited to any or all antennas operating automatically in transmit and/or receive mode with any and/or all home network or client devices. In many cases, this automatic operation may not be optimal for wireless communications performance between a communications device and another home device. Further, it is not always possible to determine and configure specific antenna operating parameters, as an alternative to, or in addition to, any automatic transmission configuration in a communication device. These alternative or additional configurations may be based on certain parameters, such as specific device communications transactions. As a result, there is a need for configuring transmission and reception operation such that an antenna system on a network communication device may be statically configured to operate and transact with another network communication device. The present embodiments described herein address these and/or other issues.

BRIEF SUMMARY OF THE INVENTION

In accordance with an aspect of the present disclosure, a method is disclosed. According to an exemplary embodiment, the method comprises establishing a communication transaction between a first device and a second device, the transaction established under an automatic configuration control mode of the first device, identifying a desired configuration for the first device during the established communication transaction, and using at the first device, the desired configuration in place of a configuration provided under the automatic configuration control mode for the established communication transaction between the first device and the second device.

In accordance with another aspect of the present disclosure, a device, such as a gateway device, is disclosed. According to an exemplary embodiment, the device includes a transceiver for establishing a communication transaction between the device and a second device, the transaction established under an automatic configuration control mode of the device, and a processor for enabling a user to identify a desired configuration for the device during the established communication transaction, and for causing the device to use the desired configuration in place of a configuration provided under the automatic configuration control mode for the established communication transaction between the device and the second device.

The aforementioned brief summary of exemplary embodiments of the present disclosure is merely illustrative of the inventive concepts presented herein, and is not intended to limit the scope of the present disclosure in any manner.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

The exemplifications set out herein illustrate preferred embodiments of the disclosure, and such exemplifications are not to be construed as limiting the scope of the disclosure in any manner.

DESCRIPTION OF THE PREFERRED EMBODIMENTS

It should be understood that the elements shown in the drawings may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually; the particular technique being selectable by the implementer as more specifically understood from the context.

The following describes a system and circuits used for transmitting and receiving signals in a local or home network. Other systems and circuits utilized to transmit and receive other types of signals in other networks may include very similar structures. Those of ordinary skill in the art will appreciate that the embodiment of the circuits described herein is merely one potential embodiment. As such, in alternate embodiments, the components of the system may be rearranged or omitted, or additional components may be added based on particular attributes of the system. For example, with minor modifications, the circuits described may be configured for use in other types of wireless communication networks including networks operating outside of the home (e.g., cellular phone communication networks).

The present disclosure generally relates to an apparatus and method for allowing a configuration of the operation of one or more antennas in a device and/or system, such as a gateway device or network device. The configuration allows, among other things, detecting the presence of or proper operation of a specific antenna in a multiple antenna device and/or system, and in some cases an accompanying transmission and reception circuit, in order to operate and/or transact with another device (e.g., gateway device or network device).

One or more of the embodiments described herein are directed at, among other things, establishing a fixed configuration for one or more communication devices in a communication network based on communication transactions. Many communication devices utilize more than one antenna for transmitting and receiving signals. Most of these devices will provide some form of automatic antenna control, such as diversity switching, to optimize signal transmission and reception. However, in some instances, it may be advantageous to establish a fixed configuration or arrangement with respect to one or more of the plurality of antennas. In one instance, this fixed configuration may be established based on a particular communication transaction, such as a transaction or link established between a particular first device and a particular second device. Devices according to principles of the present disclosure include a configuration control mode that allows for automatic operation, and also provide the ability for users to establish a fixed antenna configuration based on a communication transaction.

One of more of the embodiments described herein are directed at, among other things, determining if an antenna is properly attached and configured transmission and/or reception of communication signals in a communication network.

Devices according to principles of the present invention include a configuration mode that allows for measuring at least one parameter of a received signal, determining if the measured parameter of received signal exceeds a signal level value, and providing an indication that an antenna is not connected if the signal received does not exceed the signal level value.

Figure 1:
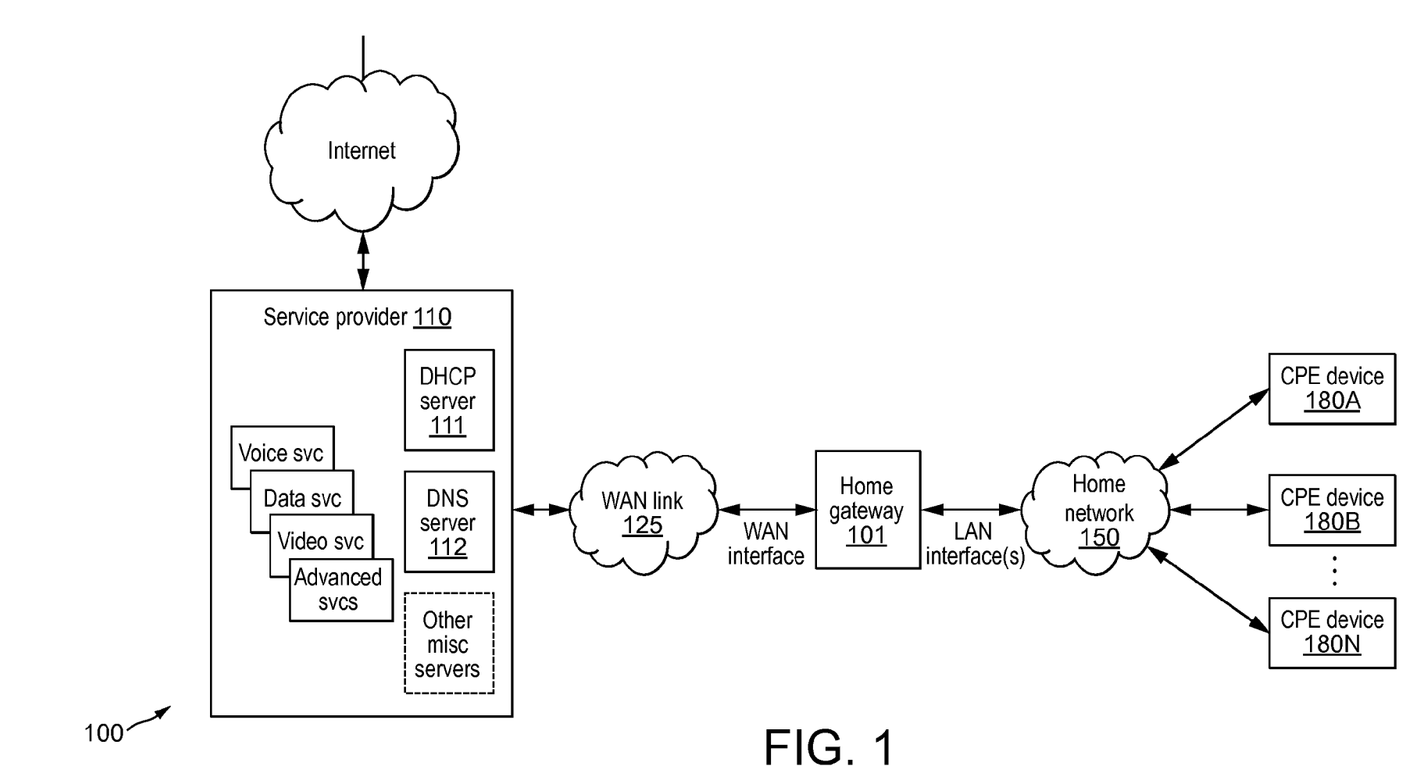
FIG. 1 shows a block diagram of a typical arrangement for a networking communication system including a home gateway device according to an exemplary embodiment of the present invention.

Referring now to the drawings, and more particularly to FIG. 1, a block diagram of a typical arrangement for a networking communication system 100 according to aspects of the present disclosure is shown. According to an exemplary embodiment, home gateway 101 is an advanced cable gateway, cable modem, DSL modem or the like, and is coupled to a wide area network (WAN) link 125 through a WAN interface to service provider 110. The WAN link 125 may be any one or more of the possible communication links including, but not limited to, coaxial cable, fiber optic cable, telephone line, or over the air links. The home gateway 101 is also coupled via a local area network (LAN) interface to home network 150 which couples one or more customer premises equipment (CPE) devices 180A-N. The home network 150 preferably includes a wireless link but may also include wired links such as co-axial cable or Ethernet. CPE devices 180A-N may include, for example, personal computers, network printers, digital set-top boxes, and/or audio/visual media servers and players, among others.

Service provider 110 provides one or more services, such as voice, data, video and/or various advanced services, over WAN link 125 to CPE devices 180 through home gateway 101 and LAN interface 150. Service provider 110 may include internet related services and server structures such as a DHCP server 111 and DNS server 112, and may include other servers and services as well (e.g., video on demand, news, weather). It is important to note that these servers and services can be co-located or widely distributed, physically and/or virtually, in both hardware and software. It is contemplated that service provider 110 operates in a conventional manner in accordance with well known protocols. In an illustrative cable application, service provider 110 may be, for example, a cable multiple service operator (MSO).

Home gateway 101 acts as the interface between the WAN link 125 external to the customer's home and the home network 150 located in the customer's home. Home gateway 101 converts transport data packets, such as packets in an IP protocol, from a format used in the WAN to a format used in the home network or LAN. Home gateway 101 also routes data packets, including the converted data packets between the WAN and one or more devices on the home network. Home gateway 101 may include interfaces for both wired networking (e.g., Ethernet or Multimedia over Coaxial cable Alliance (MoCA)) and wireless networking. Home Gateway 101 allows data, voice, video and audio communication between the WAN and CPE devices 180A-N used in the customer's home, such as analog telephones, televisions, computers, and the like.

Figure 2:
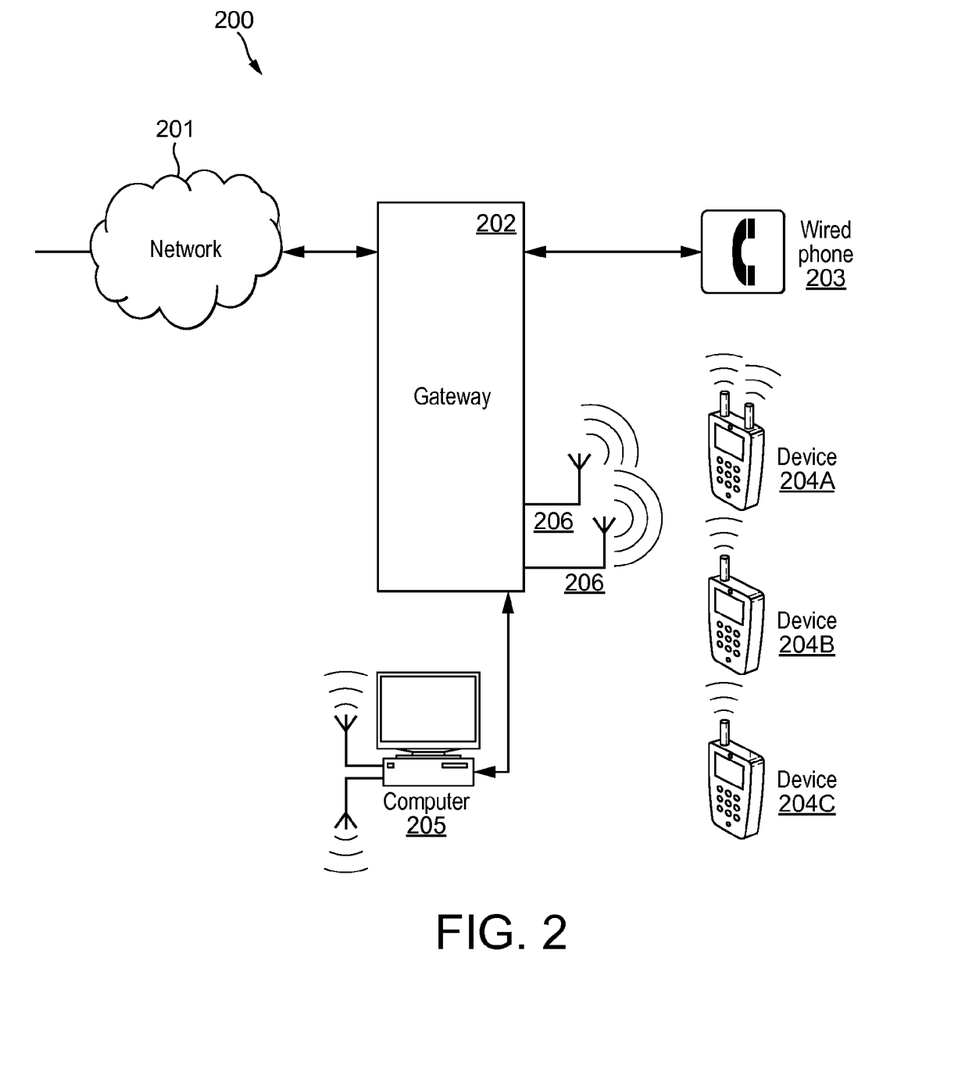
FIG. 2 shows a block diagram of an exemplary gateway system according to aspects of the present disclosure.

Turning to FIG. 2, an embodiment of a gateway system 200 according to aspects of the present disclosure is shown. Gateway system 200 operates in a manner similar to networking communication system 100 described in FIG. 1. In gateway system 200, network 201 is coupled to gateway 202. Gateway 202 connects to wired phone 203. Gateway 202 also connects to computer 205. In addition, gateway 202 interfaces with devices 204A-204C through a wireless interface using one or more antennas 206. Gateway 202 may also interface with computer 205 using the one or more antennas 206.

In particular, gateway system 200 operates as part of a cable or DSL communication network and acts to interface a packet data cable system or DSL network to one or more home networks. Gateway System 200 includes a gateway 202 that provides the interface between the network 201, operating as a WAN, and the home network(s). Gateway system 200 also includes wired analog telephone device 203 capable of operating as a home telephone when connected through gateway 202. In addition, gateway 202 also acts to provide a radio frequency (RF) interface to multiple wireless devices 204A, 204B, and 204C. Wireless device 204A, 204B, and 204C are handheld devices that operate at frequencies above 1.7 GHz using wireless packet transmissions via one or more antennas 206 on gateway 202. In other embodiments, other devices with wireless interfaces including, but not limited to routers, tablets, settop boxes, televisions, and media players may be used.

The wireless interface included in gateway 200 may also accommodate one or more wireless formats including Wi-Fi, Institute of Electrical and Electronics Engineers standard IEEE 802.11 or other similar wireless communication protocols. Further, it is important to note that each antenna in the system may be attached to a separate transceiver circuit. As shown in FIG. 2, gateway 202 includes two transceiver circuits and two antennas. Device 204A and computer 205 also include two transceiver circuits and two antennas while device 204B and device 204C include only one transmit receive circuit and one antenna. In some alternate designs it may be possible that more than one antenna may be included with, and used by, a single transceiver circuit.

In operation, gateway 202 provides internet protocol (IP) services (e.g., data, voice, video, and/or audio) between devices 204A-C and internet destinations identified and connected via network 201. Gateway 202 also provides IP voice services between wired phone 203 and call destinations routed through network 201. Gateway 202 further provides connectivity to a local computer 205 either via a wired connection such as is shown in FIG. 2 or via a wireless connection through one or more antennas and transceiver circuits. Thus, example interfaces for computer 205 include Ethernet and IEEE 802.11.

Figure 3:
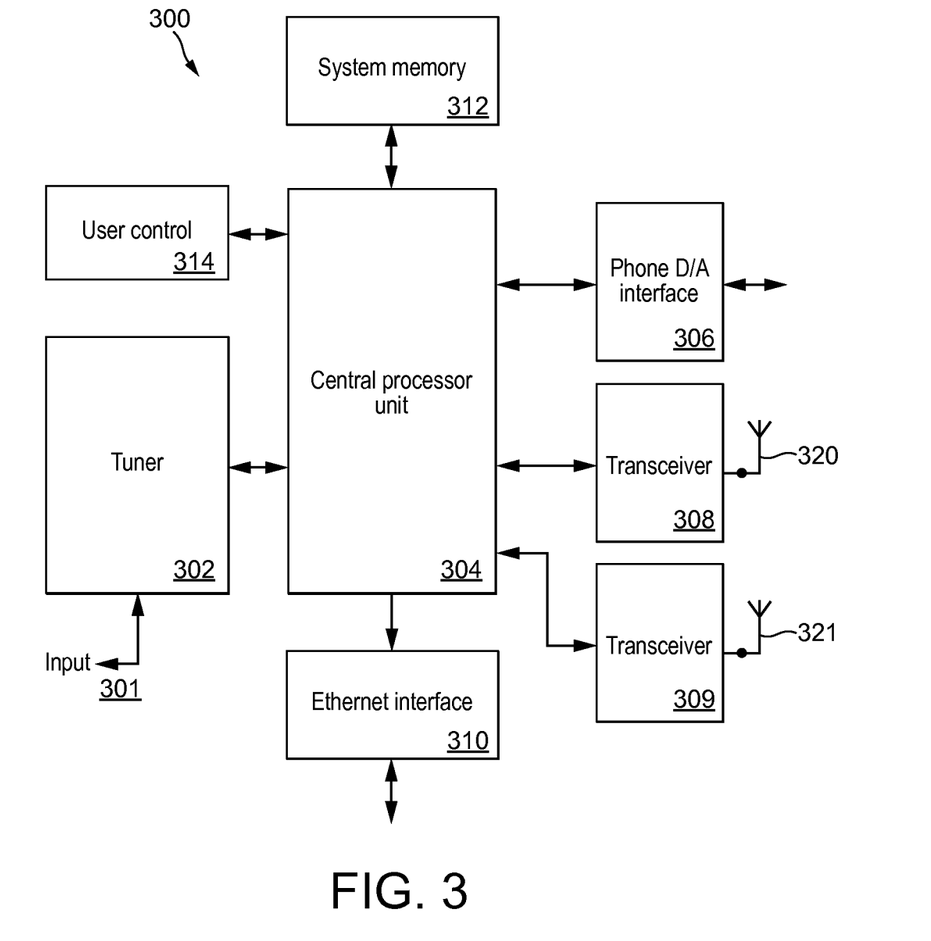
FIG. 3 shows a block diagram of an exemplary gateway device, according to aspects of the present disclosure.

Turning to FIG. 3, a block diagram of an exemplary gateway device 300 according to aspects of the present disclosure is shown. Gateway device 300 may correspond to gateway 202 described in FIG. 2 or to home gateway 101 described in FIG. 1. In gateway device 300, an input signal is provided to RF input 301. RF input 301 connects to tuner 302. Tuner 302 connects to central processor unit 304. Central processor unit 304 connects to phone D/A interface 306, transceiver 308, transceiver 309, Ethernet interface 310, system memory 312, and user control 314. Transceiver 308 further connects to antenna 320. Transceiver 309 further connects to antenna 321. It is important to note that several components and interconnections necessary for complete operation of gateway device 300 are not shown in the interest of conciseness, as the components not shown are well known to those skilled in the art. Gateway device 300 may be capable of operating as an interface to a cable or DSL communication network and further may be capable of providing an interface to one or more devices connected through either a wired and wireless home network.

A signal, such as a cable or DSL signal on the WAN, is interfaced to tuner 302 through RF input 301. Tuner 302 performs RF modulation functions on a signal provided to the WAN and demodulation functions on a signal received from the WAN. The RF modulation and demodulation functions are the same as those commonly used in communication systems, such as cable or DSL systems. Central processor unit 304 accepts the demodulated cable or DSL signals and digitally processes the signal from tuner 302 to provide voice signals and data for the interfaces in gateway 300. Similarly, central processor unit 304 also processes and directs any voice signals and data received from any of the interfaces in gateway 300 for delivery to tuner 302 and transmission to the WAN.

System memory 312 supports the processing and IP functions in central processor unit 304 and also serves as storage for program and data information. Processed and/or stored digital data from central processor unit 304 is available for transfer to and from Ethernet interface 310. Ethernet interface may support a typical Registered Jack type RJ-45 physical interface connector or other standard interface connector and allow connection to an external local computer. Processed and/or stored digital data from central processor unit 304 is also available for digital to analog conversion in interface 306. Interface 306 allows connection to an analog telephone handset. Typically, this physical connection is provided via an RJ-11 standard interface, but other interface standards may be used. Processed and/or stored digital data from central processor unit 304 is additionally available for exchange with transceiver 308 and transceiver 309. Transceiver 308 and transceiver 309 can both support multiple operations and networked devices simultaneously. Central processor unit 304 is also operative to receive and process user input signals provided via a user control interface 314, which may include a display and/or a user input device such as a hand-held remote control and/or other type of user input device.

It is important to note that devices employing multiple antennas and in some cases multiple transceivers or transmit/receive circuits, such as the cable or DSL gateways described above or other networking devices, may operate in a number of transmit and receive modes. In one mode, only one antenna (and one transceiver circuit) is used for both transmission and reception, known as single input single output (SISO) mode. In a second mode, only one antenna is used for transmission and more than one antenna (using one or more transceiver circuits) may be used for reception, known as multiple input single output (MISO) mode. In a third mode, more than one antenna (using one or more transceiver circuits) may be used for transmission while only one antenna is used for reception, known as single input multiple output (SIMO) mode. Finally, more than one antenna (using one or more transceiver circuits) may be used for transmission and reception, known as multiple input multiple output (MIMO) mode. The present embodiments are intended to address issues found in any one of these modes, but are most useful for operation using the latter three modes.

As described earlier, home gateways or modems and many home networking devices may employ multiple transceiver circuits and allow operation using multiple antennas. In some cases, each transmitter circuit and each receiver circuit may be attached to more than one antenna. In other cases, a combined transceiver circuit may be connected to more than one antenna. In still other cases, more than one combined transceiver circuit may each be connected to one or more antennas. In each of these cases, wireless communication performance between the home gateway or modem and network client device (e.g., computer, tablet, and appliance) may be governed in part by the position and location of a particular antenna. In other words, although multiple antennas may be employed, optimal performance may be achieved, or a particular device to device transaction may be best suited, using a particular antenna configuration, including using only one of the available antennas.

Further, some gateway devices may employ multiple transceiver circuits and allow operation using multiple antennas but also operating using a primary and auxiliary antenna. In some instances, these circuits may employ a primary antenna that is always installed (e.g., factory installed) and a secondary antenna which may or may not be installed and further may be installed by a user. In this case, it is desirable to determine whether the auxiliary antenna is installed and is operational.

Figure 4:
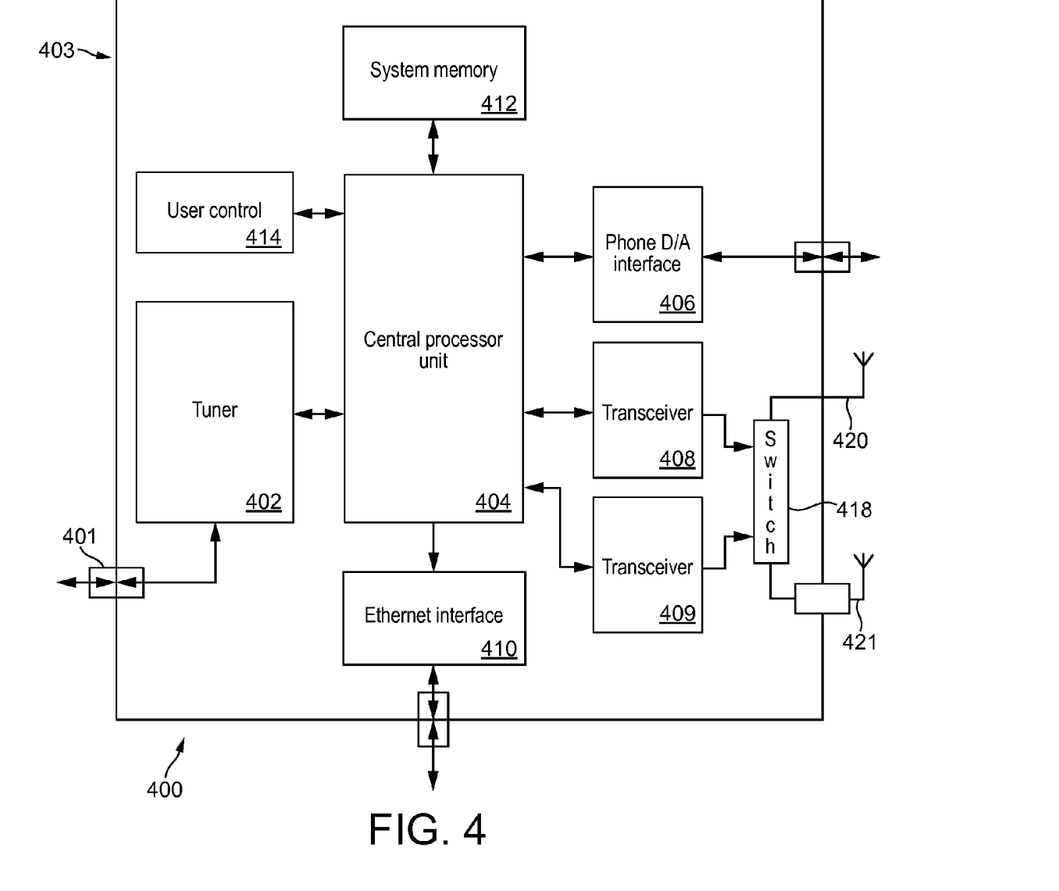
FIG. 4 shows a block diagram of another exemplary gateway device, according to aspects of the present disclosure.

Turning to FIG. 4, a block diagram of another exemplary gateway device 400 according to aspects of the present disclosure is shown. Gateway device 400 may correspond to gateway 202 described in FIG. 2 or to home gateway 101 described in FIG. 1. In gateway device 400, an input signal is provided to RF input 401. RF input 401 connects to tuner 402. Tuner 402 connects to central processor unit 404. Central processor unit 404 connects to phone D/A interface 406, transceiver 408, transceiver 409, Ethernet interface 410, system memory 412, and user control 414. Transceiver 408 and transceiver 409 further connect to switch 418. Switch 418 connects to antenna 420 and antenna 421. An enclosure 403 contains all of the blocks in gateway device 400 except for antenna 420 and antenna 421. It is important to note that several components and interconnections necessary for complete operation of gateway device 400 are not shown in the interest of conciseness, as the components not shown are well known to those skilled in the art. Gateway device 400 may be capable of operating as an interface to a cable or DSL communication network and further may be capable of providing an interface to one or more devices connected through either a wired and wireless home network.

It is important to note that, except as described below, functions and operations associated with the blocks in gateway device 400 are similar to those similarly described earlier for gateway device 300 in FIG. 3. As a result, their function and operation will not be described in further detail here.

Gateway device 400 includes an enclosure 403 that houses all of the various circuit blocks used in gateway device 400, except for antenna 420 and antenna 421. Enclosure 403 also serves as a mounting point for the physical connection interfaces used in gateway device 400, including the RF input 401, the connector used for Ethernet interface (e.g., RJ-45 connector) and the connector used for the phone D/A interface 406 (e.g., RJ-11 connector). Enclosure 403 also serves as a mounting point for a connector used to connect antenna 421 to gateway device 400. In this manner, antenna 421 is considered an optional attachable antenna that may be added and removed by a user. Optional attachable antenna 421 may also referred to as an auxiliary antenna while antenna 420, which is permanently connected to gateway device 400 may be referred to as a primary antenna. The optional attachable antenna 421 may not always be present during use of gateway device 400.

It is important to note that, although antenna 420 is described as external to enclosure 403, in some embodiments, antenna 420, as the primary antenna, may be housed inside enclosure 403. Antenna 421 will typically remain external to enclosure 403 in order to facilitate user attachment and removal.

Gateway 400 also includes switch 418. Switch 418 allows either transceiver 408 or transceiver 409 to connect to either antenna for 420 or antenna 421. Since antenna 421 is an optional, one of the outputs of switch 418 is actually connected to the signal line and connector used for attaching antenna 421. The connector used may be any type RF connector (e.g., F-connector) with a mating plug included as part of the mechanical assembly for antenna 421.

The central processor unit 404 in gateway 400 may include software, firmware or code for controlling one or both of transceiver 408 and transceiver 409 to determine whether the optional attachable antenna 421 is detached from gateway 400 or otherwise not functioning properly. In one embodiment, one of transceiver 408 and transceiver 409, as a communication interface, may measuring one or more signal parameter (e.g., signal level, signal quality, and signal to noise ratio) of the received signal when configured to connect to an antenna that can be detached. Gateway 400 (e.g., central processor unit 404) determines if the measured parameter of received signal exceeds a signal level value and provided an indication that the antenna is detached or otherwise not properly connected to the transceiver if the signal received at the first input does not exceed the signal level value. Gateway 400 (e.g., central processor unit 404) may further inhibit or prevent operation of the transceiver (e.g., transceiver 408 or transceiver 409) when it is configured to connect to and operate with the optional attachable antenna (e.g., antenna 421) when it is detached or otherwise not operating properly.

The inclusion of a removable antenna, such as antenna 421, along with switch 418 facilitates several additional antenna configuration issues. For example, it may be important to determine the presence of and/or proper operation of the optional attachable antenna (e.g., antenna 421) in order to facilitate proper automatic antenna configuration or optional manual antenna configuration, as described in the present embodiments. Switch 418 may allow either transceiver (e.g., transceiver 408 and transceiver 409) to be connected to one or the other antenna. Both transceivers may even be connected to one antenna in the event that the optional attachable antenna is not present. Further it may be important for other devices used in the network and communicating in the network to know if an optional antenna is present on the gateway device in order to adjust any antenna configurations or other communication parameters on the other devices.

It should be appreciated by one skilled in the art that the blocks described inside either gateway device 300 in FIG. 3 or gateway device 400 in FIG. 4 have important interrelations, and some blocks may be combined and/or rearranged and still provide the same basic overall functionality. For example, transceiver 408, transceiver 409, and switch 418, may be combined into one common circuit block or switch 418 may be incorporated into one or the other of transceiver 408 and transceiver 409. Further, each of transceiver 408 and transceiver 409 may include a switch and interface for a second optional detachable antenna, not shown. Additionally, control of various functions may be distributed or allocated based on specific design applications and requirements. As an example, control for switch 418 may be initiated in central processor unit 404 with a command sent to a control circuit in either transceiver 408 or transceiver 409. Control of switch 418 is then performed by either one or both transceiver 408 and transceiver 409.

Figure 5:
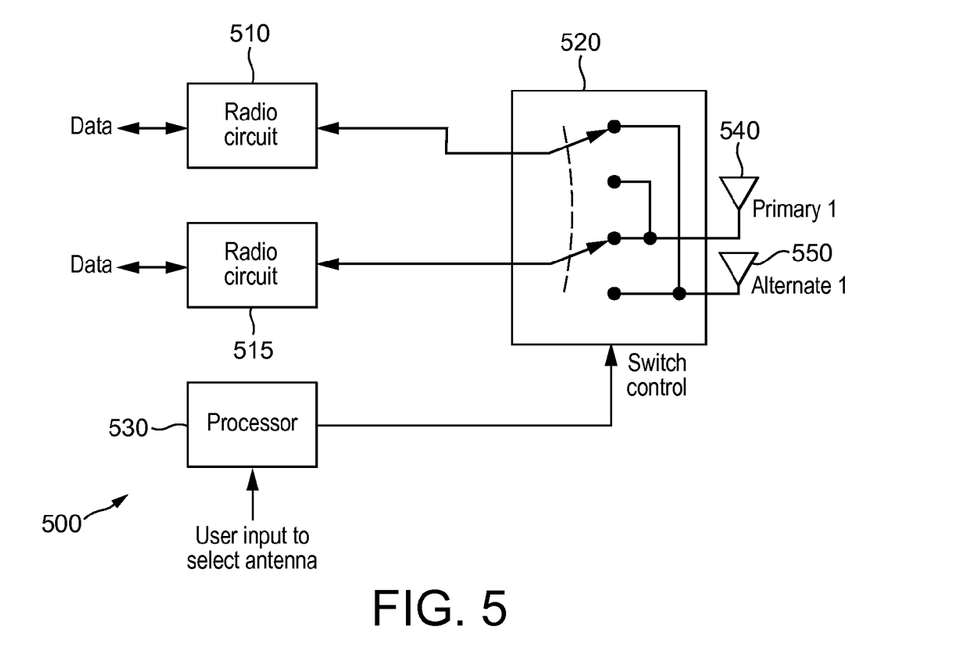
FIG. 5 shows a block diagram of an exemplary transceiver circuit according to aspects of the present disclosure.

Referring to FIG. 5, a block diagram of a transceiver circuit 500 according to aspects of the present disclosure is shown. Transceiver circuit 500 may be included as part of a gateway device, such as gateway device 400 described in FIG. 4. Transceiver circuit 500 may alternatively be includes as part of gateway 300 described in FIG. 3, gateway 202 described in FIG. 2, or home gateway 101 described in FIG. 1. Radio circuit 510 and radio circuit 515 process data (e.g., transmit and receive packets) coupled from other portions of the gateway device. Radio circuit 510 and radio circuit 515 are connected to antenna switch 520. Antenna switch 520 connects to both antenna 540 and antenna 550. A processor 530 also connects to antenna switch 520. Several components and interconnections necessary for complete operation of transceiver circuit 500 are not shown in the interest of conciseness, as the components not shown are well known to those skilled in the art.

Transceiver circuit 500 includes two radio circuits (radio circuit 510 and radio circuit 515), that operate similar to the transceiver circuits described earlier. Each of radio circuit 510 and radio circuit 515 are capable of being connected to either antenna 540 ("Primary 1") or antenna 550 ("Alternate 1") through antenna switch 520. Control for antenna switch 520 is provided through a microcontroller or microprocessor 530. Antenna switch 520 includes two inputs and four outputs and is configured as a double pole double throw switch. This arrangement includes the input arms of the switch to be switched in unison between each one of the two possible outputs. In other embodiments, different switching arrangements may be possible, including separate and independent switching between the inputs and the outputs.

In operation, the switch control input to antenna switch 520 may be determined automatically based on current performance conditions. However, in some instances, certain conditions may dictate that a particular gateway to client device transaction session should remain on the same antenna. As a result, switch control is based on the transaction with the client device rather than on current or automatic performance detection. Processor 530, based on the client transaction, controls antenna switch 520 to select either the primary or alternate antenna, and maintains this configuration until an additional change (e.g., a change made by the user) or the transaction with the client device is complete.

Further, either processor 530 or another controller circuit in the gateway device may use transceiver circuit 500 to determine the presence or, or proper operation of antenna 550 when it is an optional or user attachable antenna is used for one of the antennas, as described earlier in FIG. 4. For example, the received signal at radio circuit 510 may be monitored with radio circuit 510 connected to the signal line and connector used for attaching antenna 550. The signal received by radio circuit 510 may be transmitted through radio circuit 515 and antenna 540 or may be transmitted from another device in the network. If a measured parameter of the received signal at radio circuit 510 exceeds a threshold value, then antenna 550 is present and operating properly. If measurement does not exceed the threshold, then antenna 550 is either not present or not properly operating. The threshold value may be determined, for instance, based on a factory calibration value or a previous, initial, or differential measurement.

Figure 6:
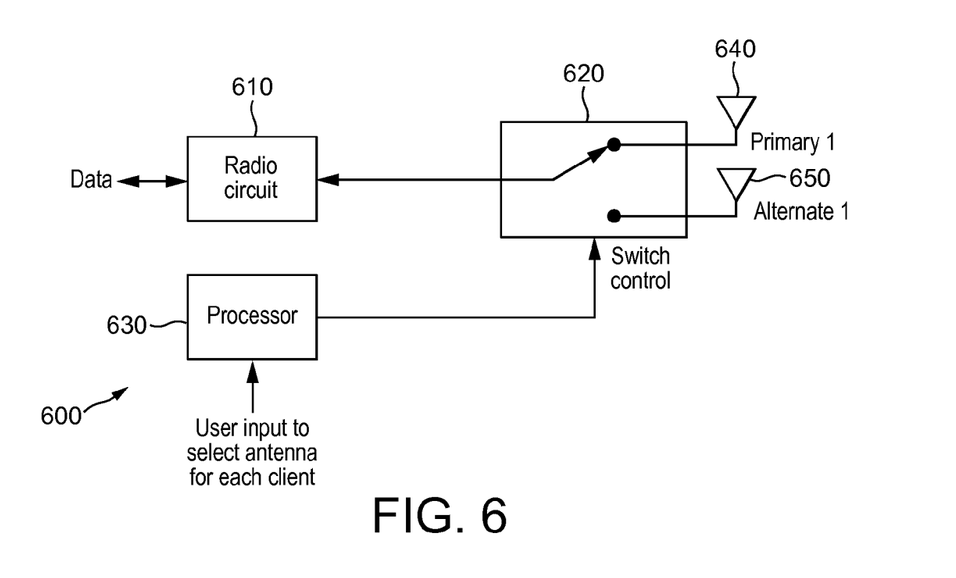
FIG. 6 shows a block diagram of another exemplary transceiver circuit according to aspects of the present disclosure.

Referring to FIG. 6, a block diagram of another transceiver circuit 600 according to aspects of the present disclosure is shown. Transceiver circuit 600 may be included as part of a gateway device, such as gateway device 300 described in FIG. 3. Transceiver circuit 600 may alternatively be included as part of gateway 400 described in FIG. 4, gateway 202 described in FIG. 2, or home gateway 101 described in FIG. 1. A radio circuit 610 processes data (e.g., transmit and receive packets) coupled from other portions of the gateway device. Radio circuit 610 is connected to antenna switch 620. Antenna switch 620 connects to antenna 640 and to antenna 650. A processor 630 also connects to antenna switch control 620. Several components and interconnections necessary for complete operation of transceiver circuit 600 are not shown in the interest of conciseness, as the components not shown are well known to those skilled in the art.

Transceiver circuit 600 shows a radio circuit 610, similar to the transceivers described earlier, capable of being connected to antenna 640 ("Primary 1") or antenna 650 ("Alternate 1")

through an antenna switch 620. Control for antenna switch 620 is provided through a microcontroller or microprocessor 630.

In operation, the switch control input to antenna switch 620 may be determined automatically based on current performance conditions. However, in some instances, certain conditions may dictate that a particular gateway to client device transaction session should remain on the same antenna. As a result, switch control is based on the transaction with the client device rather than on current or automatic performance detection. Microprocessor 630, based on the client transaction, controls antenna switch 620 to select either the primary or alternate antenna, and maintains this configuration until an additional change (e.g., a change made by the user) or the transaction with the client device is complete.

It is important to note that a gateway device, such as gateway device 300 described in FIG. 3, may include more than one transceiver circuit 600. In this way, more than two antennas may be incorporated in the gateway device, with each transceiver circuit controlling two different antennas. Further, the gateway device may be configured such that one of the antennas for each transceiver circuit is optionally detachable, as described earlier for gateway device 400 in FIG. 4.

Figure 7:
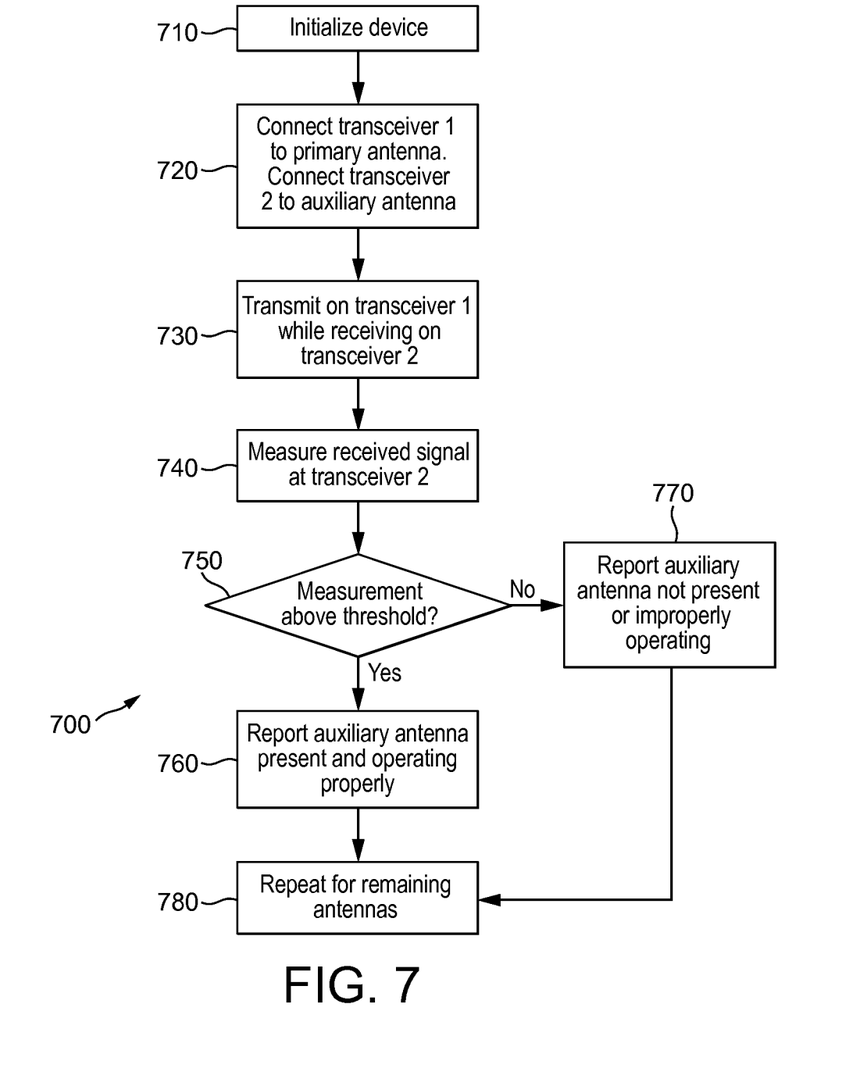
FIG. 7 shows a flowchart of an exemplary antenna operation selection process according to aspects of the present disclosure.

Referring now to FIG. 7, a flowchart illustrating a process 700 for setting antenna operation according to aspects of the present disclosure is shown. In particular, process 700 shows steps that may be employed in order to select a static antenna configuration according to principles of the present invention. For purposes of example and explanation only, the steps of process 700 may be described with specific reference to gateway device 400 described in FIG. 4. However, the steps of process 700 may also be equally useful for operation of gateway device 300 described in FIG. 3, gateway device 202 described in FIG. 2, or home gateway 101 described in FIG. 1. Further, the steps of process 700 may be used to control the operation of an antenna switch control circuit, such as the antenna switch 520 described in FIG. 5 or the antenna switch 620 described in FIG. 6. The steps of process 700 are exemplary only and are not intended to limit the present invention in any manner.

Process 700 may primarily be used to determine the presence of, or proper operation of, an antenna connected to a device and used in a communication network. Process 700 may be used to determine, for example, whether an optional attachable antenna has been added or connected to the device by a user. In process 700, at step 710, the device is initialized in some manner. Initialization, at step 710, may occur when the device is powered on. Alternatively, the device may be initialized by the selection of a button on the user interface or by selection of an entry in a graphical user interface.

Next, at step 720, a first configuration for the transmission and reception of a signal using the device is established. The first configuration at step 720 includes connecting a first transceiver circuit, such as transceiver 409, to the primary antenna, such as antenna 420, using an antenna switch, such as switch 418. The first configuration also includes connecting a second transceiver circuit, such as transceiver 408, to the auxiliary antenna, such as antenna 421, using an antenna switch, such as switch 418. It is important to note that the antenna switch may only connect the second transceiver to connection line and connector that is used to connect the auxiliary antenna to the device since the presence of the auxiliary antenna may not be known.

Next, at step 730, a signal is provided to and transmitted by the first transceiver circuit for reception by the second transceiver circuit. The signal may be a normal data signal used as part of the communication system. Alternatively, the signal may be a test signal specifically generated by the device in order to facilitate a measurement as part of process 700. At step 740, the received signal is measured using the second transceiver. The measurement made may include measurement of received power, signal strength, signal to noise ratio, or other quality measurement related to the type of communication signal that is transmitted. Also, at step 740, recording of the measurement result may be done by a microcontroller included in the transceiver or by a main processor and memory, such as central processor unit 404 and system memory 412, included in the device.

If, at step 750, the measured value exceeds a threshold value for the measurement, then, at step 760, the process reports that the auxiliary antenna connected to the second transceiver is connected and operating properly. The reported result may be included as part of information provided to the user in the user interface for the device. The reported result may also be provided to the main processor of the device, in order to be used in conjunction with either an automatic antenna configuration and optimization process for data communication or in conjunction with another antenna configuration process, such as the process described subsequently in FIG. 8.

If, at step 750, the measured value does not exceed the threshold value, then at step 770, the process reports that the auxiliary antenna is either not connected or is not operating properly. The reported result may be included as part of the information provided to the user. The user may, for example, be alerted, through a display message or other warning indication, that the auxiliary antenna is not present of properly functioning, prompting the user to correct the problem if necessary. The reported result may also be provided to the main processor (e.g., central processor unit 404) in order to be used in conjunction with setting up an antenna configuration process as described earlier. For example, the central processor unit 404 may further inhibit or prevent operation of the second transceiver when it is configured to connect to and operate with the auxiliary antenna (e.g., antenna 421) when it is detached or otherwise not operating properly.

The threshold value used at step 750 may be a value established during factory assembly and stored in the memory of the device. The threshold value may also be a value determined using an initial or other previous calibration. For example, the user may calibrate the device initially using the auxiliary antenna and store the measured value. Then, subsequent times during power up or reset, process 700 uses the stored value as the threshold to determine presence of and proper operation of the antenna.

Finally, at step 780, the process may be repeated for additional antennas. It is important to note that process 700 may be used to confirm proper operation of the primary antenna using the auxiliary antenna (when present). In this case, the auxiliary antenna would be connected to the first transceiver and the primary antenna would be connected to the second transceiver at step 720. If more than two transceiver circuits and antenna sets are used, the steps of process 700 may be repeated to detect alternate antenna presence and operation in any of the circuits by establishing one of the transceivers as the transmission source and using the primary antenna of the antenna set.

Further, the steps of process 700 may be easily extended to determining proper operation of antennas on more than one device at the same time. For example, if a gateway device and a client device both use primary and optional detachable antennas, then process 700 may be used to determine the presence of and proper operation of the auxiliary antennas for both devices. A transceiver is set up to transmit a signal from the gateway device to the client device using the primary antenna on the gateway device. The client device sets up a transceiver to receive the signal using both the primary antenna and the optional attachable antenna. Measurements may be made for both antenna configurations. If a difference between the measured values is smaller than a threshold value, then the optional attachable antenna is present and operating properly. The results determined at the client device may be communicated back to the gateway device by transmission using the primary antenna.

Figure 8:
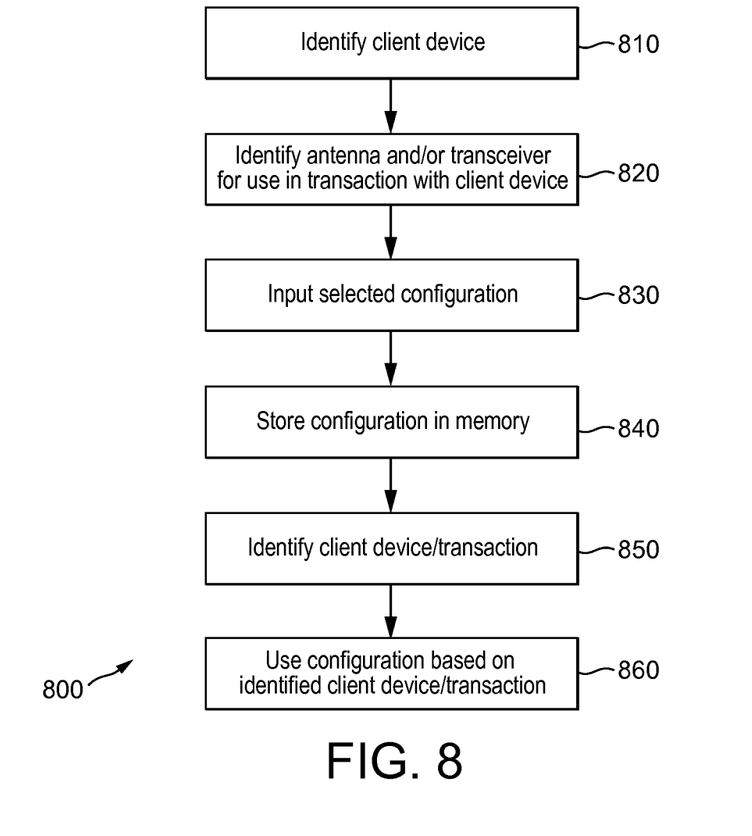
FIG. 8 shows a flowchart of another exemplary antenna operation selection process according to aspects of the present disclosure.

Referring now to FIG. 8, a flowchart illustrating a process 800 for setting antenna operation according to aspects of the present disclosure is shown. In particular, process 800 shows steps that may be employed in order to select a static antenna configuration according to principles of the present invention. For purposes of example and explanation only, the steps of process 800 may be described with specific reference to gateway device 300 described in FIG. 3. However, the steps of process 800 may also be equally useful for operation of gateway device 400, described in FIG. 4, gateway device 202 described in FIG. 2, or home gateway 101 described in FIG. 1. Further, the steps of process 800 may be used to control the operation of an antenna switch control circuit, such as the antenna switch 520 described in FIG. 5 or the antenna switch 620 described in FIG. 6. The steps of process 800 are exemplary only and are not intended to limit the present invention in any manner.

At step 810, a client device is identified for a communication transaction. According to an exemplary embodiment, a user of gateway device 300 of FIG. 3 may identify a particular client device for a particular communication transaction at step 810 by providing one or more inputs via user control interface 314 (e.g., responsive to a display not shown herein), which are received and processed by central processor unit 304.

At step 820, an antenna and/or transceiver circuit to be used for the communication transaction with the particular client device is identified. According to an exemplary embodiment, central processor unit 304 makes the identification at step 820 under an automatic configuration control mode of gateway device 300. This identification may include an initial determination of which of the antennas and/or associated transceiver circuits (e.g., transceivers 308/309 of FIG. 3) is best suited for the communication transaction between gateway device 300 and the particular client device identified at step 810, based on performance measurements made and/or other current operating conditions for the communication system (e.g., other communication between devices or type of data being transferred). Based on this initial determination, central processor unit 304 may then cause gateway device 300 to initiate or begin establishing the communication transaction with the particular client device pursuant to the aforementioned automatic configuration control mode of gateway device 300, at step 820.

However, it is noted that the aforementioned type of automatic operation may not be optimal for wireless communication performance between a gateway device and a client device in many cases. Accordingly, the present invention addresses this problem by enabling users to also define the transmission and reception operation of a device (e.g. gateway device 300 of FIG. 3) such that a particular antenna and/or its associated transceiver circuit may be statically configured to operate and transact with a particular client device. These advantageous features of the present invention are hereinafter described.

At step 830, a user inputs a selected or desired configuration. According to an exemplary embodiment, the user of gateway device 300 of FIG. 3 may perform step 830 to define (via user control interface 314) a static configuration between gateway device 300 and the particular client device identified at step 810. Also according to an exemplary embodiment, the static configuration defined at step 830 may be different from any configuration identified during the aforementioned automatic configuration control mode of gateway device 300 and may be used for the communication transaction initiated at step 820 in place of any configuration identified during the automatic configuration control mode.

At step 840, the configuration selected at step 830 is stored in memory. According to an exemplary embodiment, gateway device 300 stores data corresponding to the configuration selected by the user at step 830 in system memory 312 under the control of central processor unit 304 in response to the user's selection (e.g., activation of a control in a user interface). It is important to note steps 810-840 may be performed one or more times for one or more applicable client devices.

At step 850, a client device/transaction is identified. According to an exemplary embodiment, a user of gateway device 300 of FIG. 3 may later (after steps 510-540 are performed for one or more client devices) initiate a communication transaction with a particular client device (for which a desired static configuration has been previously defined, as described herein) by providing one or more inputs via user control interface 314. According to this exemplary embodiment, central processor unit 304 makes the identification at step 850 responsive to such user inputs and based on data retrieved from system memory 312.

Next, at step 860, a configuration is used based on the client device/transaction identified at step 850. According to an exemplary embodiment, central processor unit 304 causes the desired static configuration that has been previously defined for the particular identified client device to be used by gateway device 300 for the particular communication transaction. In this manner, a desired static configuration, which may be optimal for a given network arrangement, may be advantageously used by the gateway device in place of any configuration provided under the aforementioned automatic configuration control mode for communication transactions between the gateway device and the particular client device that occur after their initially established communication transaction, as described earlier.

Figure 9:
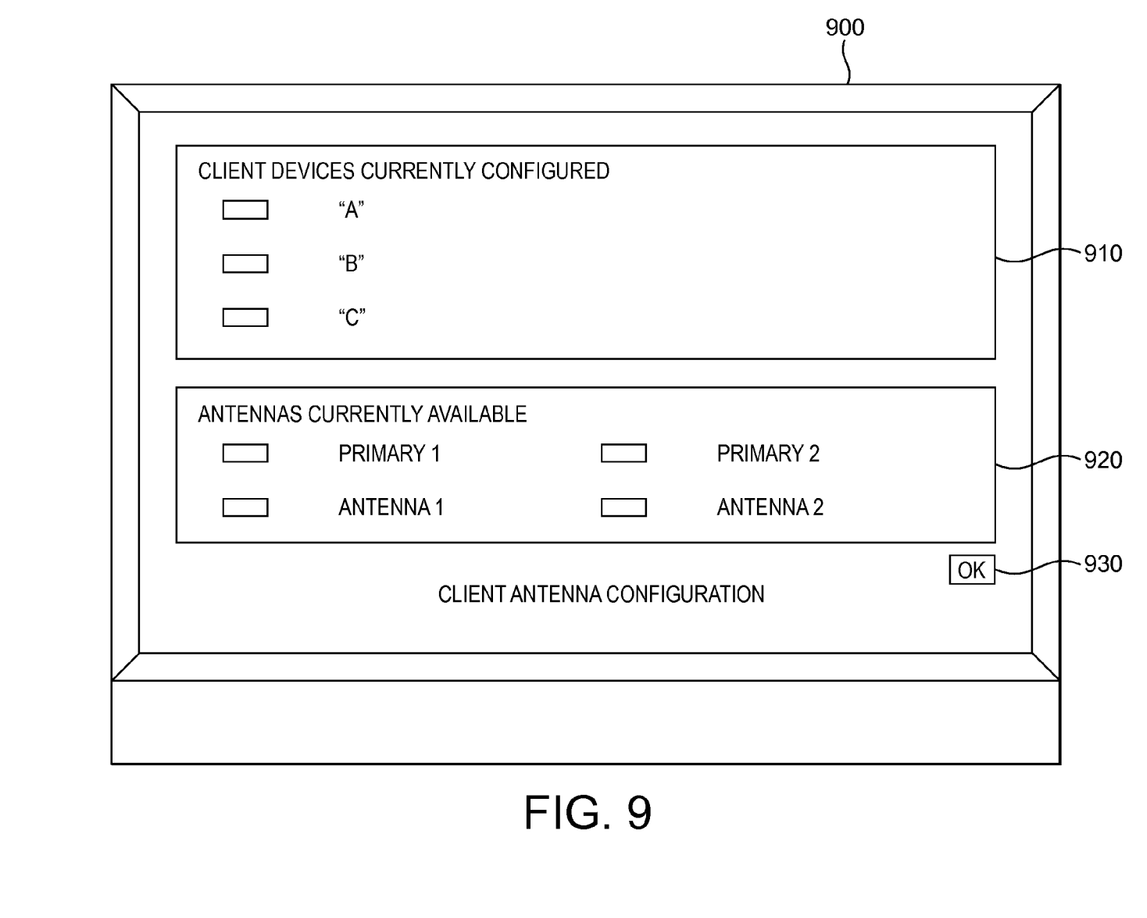
FIG. 9 shows a diagram of an exemplary user interface display according to aspects of the present disclosure.

FIG. 9 illustrates a user interface 900 that may be used in implementing one or more aspects of the present disclosure. User interface 900 may, for instance, be used in conjunction with one or more steps (e.g., steps 830 and 840) described earlier in FIG. 8. User interface 900 may be generated in a network device, such as gateway 300 described in FIG. 3, as a portion of a graphical user interface. User interface 900 may further be displayed on the device itself or may be provided for display on another device that includes a display (e.g., a television, monitor, or the like). User interface 900 may further be accessed as user interactive webpage through a network interface over either a LAN or WAN connected to the network device.

User interface 900 comprises a first section 910 that allows a user selection of a client device currently configured for operation within the LAN, and with the gateway device (e.g., cable or DSL gateway device 300 of FIG. 3). User interface 900 also comprises a second section 920 that allows a further user selection of at least one antenna for use in conjunction with the identified client device. First and second sections 910 and 920 of user interface 900 may also be displayed on separate screen pages. Once the user has made desired selections under first and second sections 910 and 220, the user may select/activate a predetermined button/element, such as "OK" element 930 in FIG. 9, to finalize the selection.

As described herein, the present disclosure provides a method and apparatus for allowing a configuration of the operation of one or more antennas in a device and/or system, such as a gateway device or other network device. Such configuration allows, among other things, a static configuration of a specific antenna in a multiple antenna device, and/or system, and in some cases an accompanying transmission and reception circuit, in order to operate and/or transact specifically with another device (e.g., network client device).

Further, the present disclosure provides a method and apparatus for detecting the operation of an antenna. The embodiments describe determining if an antenna is properly attached and configured transmission and/or reception of communication signals in a communication network. Devices according to principles of the present disclosure include a configuration mode that allows for measuring at least one parameter of a received signal, determining if the measured parameter of received signal exceeds a signal level value, and providing an indication that an antenna is not connected if the signal received does not exceed the signal level value.

Although embodiments which incorporate the teachings of the present disclosure have been shown and described in detail herein, those skilled in the art can readily devise many other varied embodiments that still incorporate these teachings. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method, comprising:
   establishing a communication transaction between a gateway device and a client device in a local area network, the transaction established under an automatic configuration control mode of the gateway device, the gateway device including a plurality of antennas and configured to provide one or more services to the client device;
   identifying a desired configuration for the gateway device during the established communication transaction, the identification of the desired configuration includes selecting one of the antennas based on the client device; and
   using at the gateway device, the desired configuration in place of a configuration provided under the automatic configuration control mode for the established communication transaction between the gateway device and the client device, wherein the desired configuration includes a static antenna configuration between the gateway device and the client device.

2. The method of claim 1, further comprised of using the desired configuration in place of the configuration provided under the automatic configuration control mode at the gateway device for communication transactions between the gateway device and the client device that occur after the established communication transaction.

3. The method of claim 1, further comprises providing a user interface that allows a user to identify the desired configuration by selecting the client device from a plurality of different devices and by selecting one of a plurality of different antennas of the gateway device for use in conjunction with the client device.

4. The method of claim 1, wherein the one or more services includes at least one of voice services, data services, video services, audio services and internet related services.

5. The method of claim 1, wherein the gateway device is at least one of a cable gateway, cable modem and DSL modem.

6. A gateway device for providing one or more services to a client device in a local area network, comprising:
   a transceiver operative to establish a communication transaction between the gateway device and a client device, the transaction established under an automatic configuration control mode of the device, the transceiver configured to be coupled to at least one of a plurality of antennas; and
   a processor operative to enable a user to identify a desired configuration for the gateway device during the established communication transaction, the identification of the desired configuration includes selecting one of the antennas based on the client device and the processor further operative to cause the gateway device to use the desired configuration in place of a configuration provided under the automatic configuration control mode for the established communication transaction between the gateway device and the client device, wherein the desired configuration includes a static antenna configuration between the gateway device and the client device.

7. The gateway device of claim 6, wherein the processor is further operative to cause the gateway device to use the desired configuration in place of the configuration provided under the automatic configuration control mode at the gateway device for communication transactions between the gateway device and the client device that occur after the established communication transaction.

8. The gateway device of claim 6,
   wherein the processor is further operative to provide a user interface that allows the user to identify the desired configuration by selecting the client device from a plurality of different devices and by selecting one of the plurality of antennas for use in conjunction with the client device.

9. The gateway device of claim 6, wherein the one or more services includes at least one of voice services, data services, video services, audio services and internet related services.

10. The gateway device of claim 6, wherein the gateway device is at least one of a cable gateway, cable modem and DSL modem.

11. A gateway device, comprising:
    first means for establishing a communication transaction between the gateway device and a client device in a local area network, the transaction established under an automatic configuration control mode of the gateway device, the gateway device including a plurality of antennas and configured to provide one or more services to the client device; and
    second means for enabling a user to identify a desired configuration for the gateway device during the established communication transaction, the identification of the desired configuration includes selecting one of the antennas based on the client device and the second means further operative for causing the gateway device to use the desired configuration in place of a configuration provided under the automatic configuration control mode for the established communication transaction between the gateway device and the client device, wherein the desired configuration includes a static antenna configuration between the gateway device and the client device.

12. The gateway device of claim 11, wherein the second means further causes the gateway device to use the desired configuration in place of the configuration provided under the automatic configuration control mode at the gateway device for communication transactions between the gateway device and the client device that occur after the established communication transaction.

13. The gateway device of claim 11, further comprising:
A plurality of antennas; and
wherein the second means further provides a user interface that allows the user to identify the desired configuration by selecting the client device from a plurality of different devices and by selecting one of the plurality of antennas for use in conjunction with the client device.

14. The gateway device of claim 11, wherein the one or more services includes at least one of voice services, data services, video services, audio services and internet related services.

15. The gateway device of claim 11, wherein the gateway device is at least one of a cable gateway, cable modem and DSL modem.

* * * * *